United States Patent
Ito et al.

(10) Patent No.: US 12,201,058 B2
(45) Date of Patent: Jan. 21, 2025

(54) RIDING GRASS MOWER WITH ROTARY BLADE DRIVE SELECTION UNIT

(71) Applicant: Kubota Corporation, Osaka (JP)

(72) Inventors: Hirokazu Ito, Sakai (JP); Kazuhiro Ochi, Sakai (JP)

(73) Assignee: Kubota Corporation, Osaka (JP)

( * ) Notice: Subject to any disclaimer, the term of this patent is extended or adjusted under 35 U.S.C. 154(b) by 641 days.

(21) Appl. No.: 17/520,047

(22) Filed: Nov. 5, 2021

(65) Prior Publication Data

US 2022/0408638 A1 Dec. 29, 2022

(30) Foreign Application Priority Data

Jun. 28, 2021 (JP) .................................. 2021-106514

(51) Int. Cl.
| | |
|---|---|
| *A01D 34/78* | (2006.01) |
| *A01D 34/00* | (2006.01) |
| *A01D 34/66* | (2006.01) |
| *A01D 101/00* | (2006.01) |

(52) U.S. Cl.
CPC .......... *A01D 34/78* (2013.01); *A01D 34/006* (2013.01); *A01D 34/662* (2013.01); *A01D 2101/00* (2013.01)

(58) Field of Classification Search
CPC .... A01D 34/78; A01D 34/006; A01D 34/662; A01D 2101/00; A01D 34/64; A01D 75/182
See application file for complete search history.

(56) References Cited

U.S. PATENT DOCUMENTS

| | | | | |
|---|---|---|---|---|
| 2009/0000839 | A1* | 1/2009 | Ishii ...................... | B62D 11/04 701/41 |
| 2012/0159916 | A1* | 6/2012 | Ishii ...................... | B60L 1/003 56/10.2 G |
| 2018/0310471 | A1 | 11/2018 | Pellenc | |
| 2019/0387670 | A1* | 12/2019 | Matsuda ................ | B60L 50/16 |
| 2020/0359565 | A1 | 11/2020 | Yamada et al. | |
| 2022/0007570 | A1* | 1/2022 | Foster ................... | A01D 34/78 |
| 2022/0007571 | A1* | 1/2022 | Foster ................... | A01D 34/008 |

FOREIGN PATENT DOCUMENTS

| | | | | |
|---|---|---|---|---|
| EP | 2272317 | A1 | 1/2011 | |
| EP | 3078252 | A1 * | 10/2016 | .......... A01D 34/006 |
| JP | 2011200189 | A * | 10/2011 | ............ A01D 34/58 |
| JP | 2013192510 | A | 9/2013 | |
| JP | 2013212006 | A | 10/2013 | |
| JP | 2019506149 | A | 3/2019 | |
| JP | 2020000114 | A * | 1/2020 | ............ A01D 34/68 |
| JP | 2020000115 | A * | 1/2020 | ............ A01D 34/68 |

* cited by examiner

*Primary Examiner* — Arpad Fabian-Kovacs
(74) *Attorney, Agent, or Firm* — The Webb Law Firm (57) ABSTRACT

A riding grass mower includes a driver seat 11 in a travel chassis 10, a mower deck 30 supported by the travel chassis 10, a rotary blade 20 in a glass-cutting space defined by side wall and a top plate 31 of the mower deck 30, a blade motor 4 configured to supply motive power to the rotary blade 20, and a blade motor control unit 55 configured to control the blade motor 4. The blade motor control unit 55 includes a main drive control unit 55a configured to rotate the rotary blade 20 forward, an auxiliary drive control unit 55b configured to rotate the rotary blade 20 backward, and a drive selection unit 55c configured to selectively operate the main drive control unit 55a and the auxiliary drive control unit 55b at a start of mowing with use of the rotary blade 20.

2 Claims, 5 Drawing Sheets

RIDING GRASS MOWER WITH ROTARY BLADE DRIVE SELECTION UNIT

CROSS-REFERENCE TO RELATED APPLICATION

This application claims priority to Japanese Patent Application No. 2021-106514 filed Jun. 28, 2021, the disclosures of which are hereby incorporated by reference in their entirety.

BACKGROUND OF THE INVENTION

1. Field of the Invention

The present invention relates to a riding grass mower in which a blade motor rotates a rotary blade.

2. Description of the Related Art

JP 2013-192510A discloses a self-propelled grass mower provided with an electric motor for rotating a rotary blade. When vines or tall grass become wrapped around the driving shaft of the mowing blade and the like while the grass mower travels and mows grass, the electric motor enters an overload state. When the overload state of the electric motor is detected, this grass mower moves in a direction opposite to the traveling direction while rotating the electric motor in reverse to rotate the mowing blade in reverse. The grass mower travels in the opposite direction with the mowing blade being rotated in a direction in which the wound grass is unwound, and the wound grass is thus removed.

JP 2013-192510A is an example of related art.

SUMMARY OF THE INVENTION

The vehicle speed of the travel chassis of a riding grass mower is faster than that of a self-propelled grass mower, and the riding grass mower can also complete a mowing operation in a shorter period of time. Furthermore, in the riding grass mower, cut grass is discharged by wind generated by the rotary blade, and therefore, a glass-cutting space is relatively unlikely to be clogged with cut grass while the riding grass mower is traveling. However, upon startup of the rotary blade, wind is not generated by the rotary blade, and the blade motor is subjected to a startup load. Accordingly, a space between a mower deck and the rotary blade may be clogged with cut grass remaining in the glass-cutting space, which is an internal space of the mower deck.

It is an object of the present invention to suppress clogging of the glass-cutting space with cut grass that occurs upon startup of the rotary blade in a riding grass mower.

A riding grass mower according to the present invention includes: a travel chassis; a driver seat in the travel chassis; a mower deck supported by the travel chassis; a rotary blade in a glass-cutting space defined by side wall and a top plate of the mower deck; a blade motor configured to supply motive power to the rotary blade; a blade motor control unit configured to control the blade motor, wherein the blade motor control unit includes a main drive control unit configured to rotate the rotary blade forward, an auxiliary drive control unit configured to rotate the rotary blade backward, and a drive selection unit configured to selectively operate the main drive control unit and the auxiliary drive control unit at a start of mowing with use of the rotary blade.

With this configuration, one of rotating the rotary blade forward, namely rotating the rotary blade in a direction used in mowing, and rotating the rotary blade backward, namely rotating the rotary blade in a direction opposite to the forward rotational direction, is selected at the start of mowing with use of the rotary blade. If cut grass remains in the glass-cutting space, the rotary blade can be temporarily rotated backward. Accordingly, even if the glass-cutting space is clogged with cut grass upon startup of the rotary blade, the rotary blade is less likely to be caught on the cut grass, and even if the rotary blade is caught on the cut grass, the cut grass can be easily removed.

Note that, in the present application, the "forward rotation" refers to rotation of the rotary blade in a rotational direction used in mowing. For example, when the rotary blade is provided with a cutting blade, the "forward rotation" is rotation of the rotary blade that is rotated such that the cutting blade moves toward grass. Some mower decks are configured such that a plurality of rotary blades are provided and are rotated in different rotational directions during mowing. However, even in such a case, each rotary blade is considered to be rotated forward. When the rotary blades are each rotated in a direction opposite to the forward rotational direction, such rotation corresponds to "backward rotation".

In one favorable embodiment of the present invention, the drive selection unit operates the auxiliary drive control unit at the start of the mowing with use of the rotary blade, and then operates the main drive control unit instead of the auxiliary drive control unit. With this configuration, at the start of mowing with use of the rotary blade, the rotary blade is first rotated backward for a short period of time, and is then rotated forward, namely in a regular direction. Accordingly, even if the glass-cutting space is clogged with cut grass, the rotary blade is less likely to be caught on the cut grass, and the clogging is resolved due to the forward-backward rotation effect.

In one of favorable embodiments of the present invention, the drive selection unit repeats an operation of the main drive control unit and an operation of the auxiliary drive control unit alternately predetermined times at the start of the mowing with use of the rotary blade, and then operates the main drive control unit instead of the auxiliary drive control unit. With this configuration, clogging due to cut grass is accurately resolved. The number of predetermined times may be set in advance or set by a driver as desired. When the amount of cut grass is small, these operations may be repeated only once, and when the amount of cut grass is large, it is preferable to repeat these operations several times. Also, changing the number of repetitions depending on the type of grass to be mowed or the weather is effective.

In mowing operations with a relatively low load, such as lawn maintenance of a golf course, clogging due to cut grass occurs in unexpected and limited circumstances. Accordingly, it is not necessary to rotate the rotary blade backward whenever mowing with use of the rotary blade is started. In another one favorable embodiment of such use in the present invention, a load detector for detecting an excessive load that occurs upon startup of the blade motor is provided, and the drive selection unit operates the main drive control unit at the start of mowing with use of the rotary blade, and in response to the load detector detecting the excessive load at the start of mowing, the drive selection unit operates the auxiliary drive control unit instead of the main drive control unit, and then operates the main drive control unit instead of the auxiliary drive control unit. Although a load detector is required, this configuration allows the auxiliary drive control unit to be operated only when the rotary blade needs to be rotated backward in order to resolve clogging due to cut grass, and thus needless backward rotation is prevented.

The auxiliary drive control unit temporarily rotates the rotary blade backward for the purpose of removing cut grass that clogs a space between the rotary blade and the mower deck, and therefore, the backward rotation can be limited to short-period or small-angle rotation. For example, it is sufficient that the rotary blade is rotated backward less than once, preferably at a rotation angle of several degrees to several tens of degrees. In other words, it is sufficient that the rotary blade is rotated backward for such a rotation period that the above-mentioned rotation angle is achieved. It is also preferable to limit the operation time of the auxiliary drive control unit in order to prevent an excessive load from being applied to the blade motor. It is also preferable to limit the operation time of the auxiliary drive control unit from the viewpoint of both the rotation angle and the rotation period. Accordingly, in the present invention, the auxiliary drive control unit rotates the blade motor backward for only a predetermined period of time or by only a predetermined rotation angle.

DETAILED DESCRIPTION OF PREFERRED EMBODIMENTS

Next, one of specific embodiments of a riding grass mower according to the present invention will be described with reference to the drawings. In this embodiment, the riding grass mower is a mid-mount electric grass mower. Note that, in this specification, the "front side" means the front side in the front-rear direction (traveling direction) of a vehicle body and the "rear side" means the rear side in the front-rear direction (traveling direction) of a vehicle body unless otherwise stated. Moreover, the left-right direction or the horizontal direction means the transverse direction of a chassis (the width direction of a chassis) that is orthogonal to the front-rear direction of the vehicle body. The "upper side" or the "lower side" refers to the positional relationship in the vertical direction (perpendicular direction) of the vehicle body, namely the relationship regarding the height from the ground.

Figure 1:
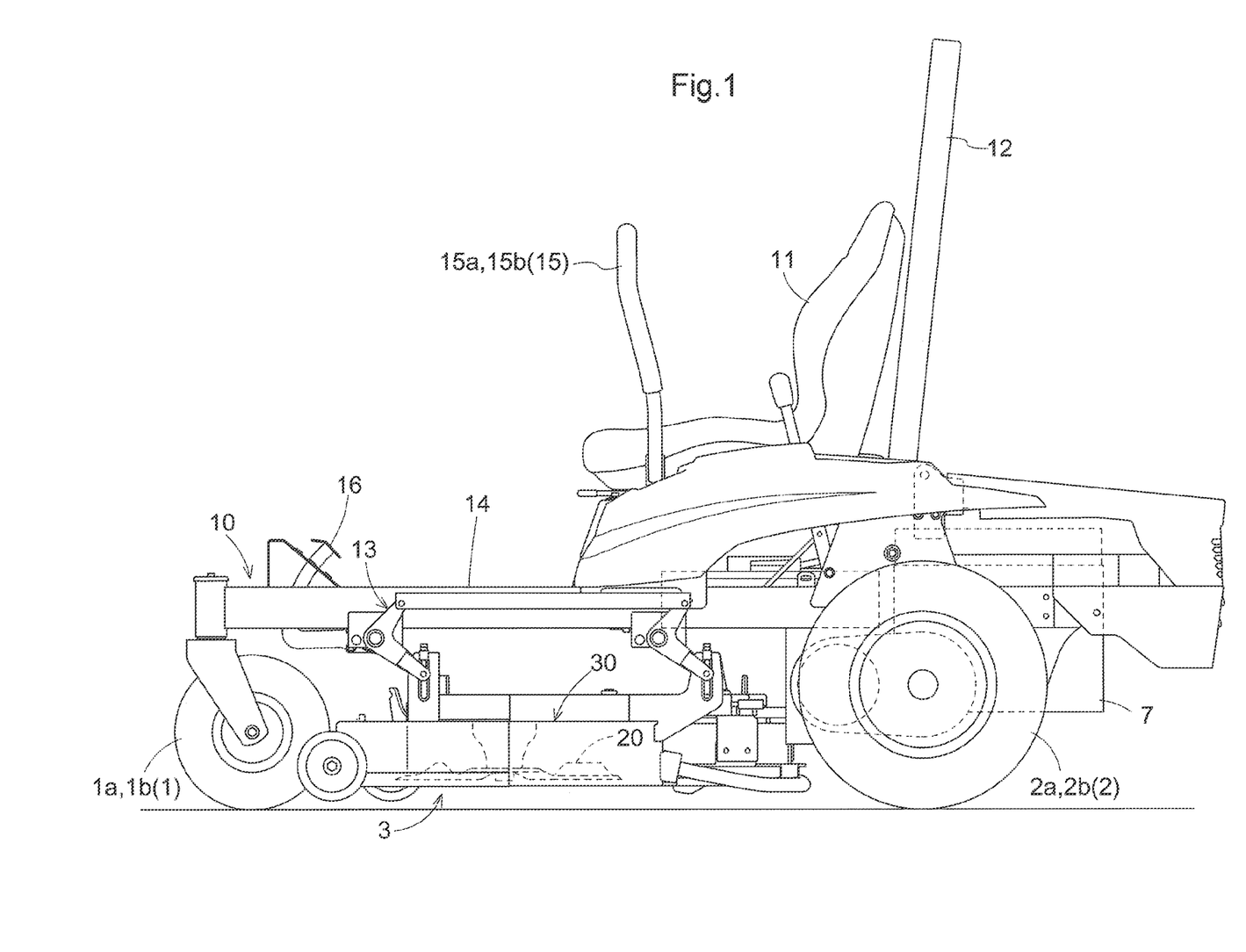
FIG. 1 is a side view of a mid-mount electric riding grass mower to which a mower unit according to the present invention is mounted.

FIG. 1 is a side view of a mid-mount electric grass mower (simply abbreviated as a "grass mower" hereinafter). This grass mower includes a front wheel unit 1 that includes a left front wheel 1a and a right front wheel 1b that are freely rotatable caster-type wheels, a driving wheel unit 2 that includes a left rear wheel 2a and a right rear wheel 2b, and a travel chassis 10 that is supported off the ground by the front wheel unit 1 and the driving wheel unit 2. A battery 7 is disposed in the rear portion of the travel chassis 10, and a driver seat 11 is disposed forward of the battery 7. A rollover protection frame 12 is provided standing upright on the rear side of the driver seat 11. A mower unit 3 is disposed in a space below the travel chassis 10 between the front wheel unit 1 and the driving wheel unit 2, and is suspended from the travel chassis 10 via a raising/lowering linkage mechanism 13 such that it can be raised and lowered.

A floor plate 14 serving as a foot rest for the driver is provided forward of the driver seat 11, and a brake pedal 16 protrudes from the floor plate 14. A left steering lever 15a and a right steering lever 15b that are included in a steering unit 15 and that swing around a horizontal swinging axis in the transverse direction of the vehicle body are respectively disposed on both sides of the driver seat 11. The rotational speed of the left rear wheel 2a can be changed with the left steering lever 15a, and the rotational speed of the right rear wheel 2b can be changed with the right steering lever 15b. The rotational speeds of the left rear wheel 2a and the right rear wheel 2b can be independently changed, and quick turning is possible by rotating the left rear wheel 2a and the right rear wheel 2b in opposite rotational directions. Accordingly, this grass mower is also called a zero-turn mower.

Figure 2:
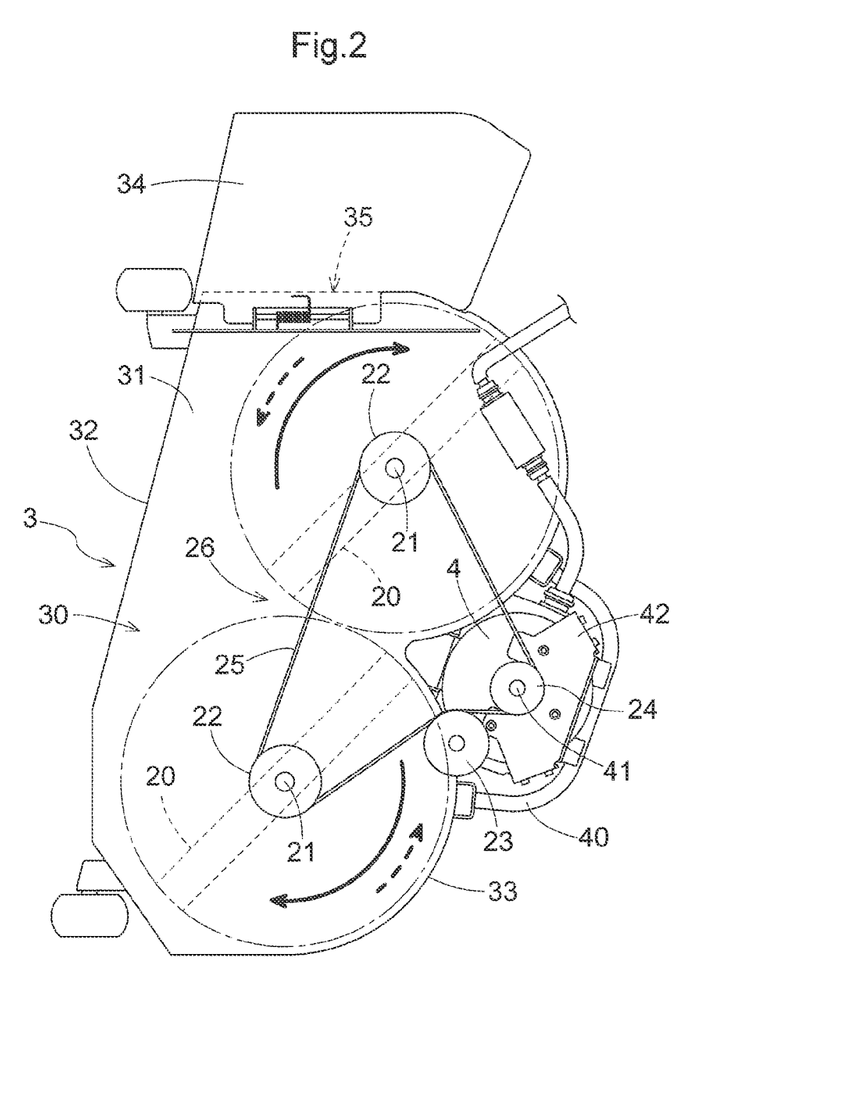
FIG. 2 is a plan view of the mower unit.

As shown in FIG. 2, the mower unit 3 is a side-discharge-type mower unit, and includes a mower deck 30 and two rotary blades 20. The left rotary blade 20 and the right rotary blade 20 are arranged side by side in the transverse direction of the vehicle body. The mower deck 30 includes a top plate 31 and a side wall that extends downward from the outer peripheral edge of this top plate 31. The side wall includes a front side wall 32 that extends downward from the front side of the outer peripheral edge of the top plate 31, and a rear side wall 33 that extends downward from the rear side of the outer peripheral edge of the top plate 31. The front side wall 32 is continuous with the front side of the outer peripheral edge of the top plate 31, and the rear side wall 33 is continuous with the rear side of the outer peripheral edge thereof. The right end regions of the front side wall 32 and the rear side wall 33 are removed, and thus a cut grass discharge opening 35, which is covered by a cover 34 from above, is formed. The rotary blades 20 are disposed in an internal space (glass-cutting space) of the mower deck 30 that is formed by the top plate 31, the front side wall 32, and the rear side wall 33.

Each of the rotary blades 20 has a band shape and is provided with a cutting blade tip at both ends of the cutting blade 20. A wind-generating vane is provided on the rear side of each cutting blade tip. When a mowing operation is performed, the grass mower travels while the rotary blades 20 are being rotated, and thus grass is cut by the rotary blades 20. The cut grass is guided to a baffle plate inside the mower deck 30 and passes through the inside of the mower deck 30 due to transporting wind generated by the wind-generating vanes of the rotary blades 20, and is released to the lateral outside of the mower deck 30 through the cut grass discharge opening 35.

Rotary shafts 21 that extend downward while passing through the top plate 31 of the mower deck 30 are rotatably supported at the top plate 31 via bearing units (not shown) fixed to the top plate 31. Each of the rotary blades 20 is fastened and fixed to the lower end of the rotary shaft 21 with use of a bolt or the like such that the rotary blade 20 can be replaced. An input pulley 22 is attached to the upper end of each rotary shaft 21.

A blade motor 4 configured to supply motive power to the rotary blades 20 is mounted on a mounting base 40 that protrudes rearward from the rear side wall 33. An output shaft 41 of the blade motor 4 is rotatably supported in a vertical orientation via a bearing inside a motor housing 42. The upper end of the output shaft 41 protrudes from the motor housing 42. An output pulley 24 is attached to this protruding portion of the output shaft 41.

A belt 25 is wound around the input pulleys 22 attached to the two rotary shafts 21, the output pulley 24 attached to the output shaft 41 of the blade motor 4, and a tension pulley unit 23 attached to the mower deck 30. That is, in this embodiment, a mower transmission mechanism for transmitting motive power from the blade motor 4 to the rotary blades 20 is configured as a belt transmission mechanism 26, and includes the output pulley 24, the tension pulley unit 23, the input pulleys 22, and the belt 25 wound around these pulleys.

In the embodiment shown in FIG. 2, the two rotary blades 20 each rotate in the clockwise direction during a mowing operation in order to feed cut grass to the cut grass discharge opening 35. The rotation in this rotational direction is forward rotation (indicated by the thick solid arrows in FIG. 2), and the rotation in a direction opposite to the forward rotational direction is backward rotation (indicated by the thick dotted arrows in FIG. 2). These rotary blades 20 can be rotated not only forward but also backward.

Figure 3:
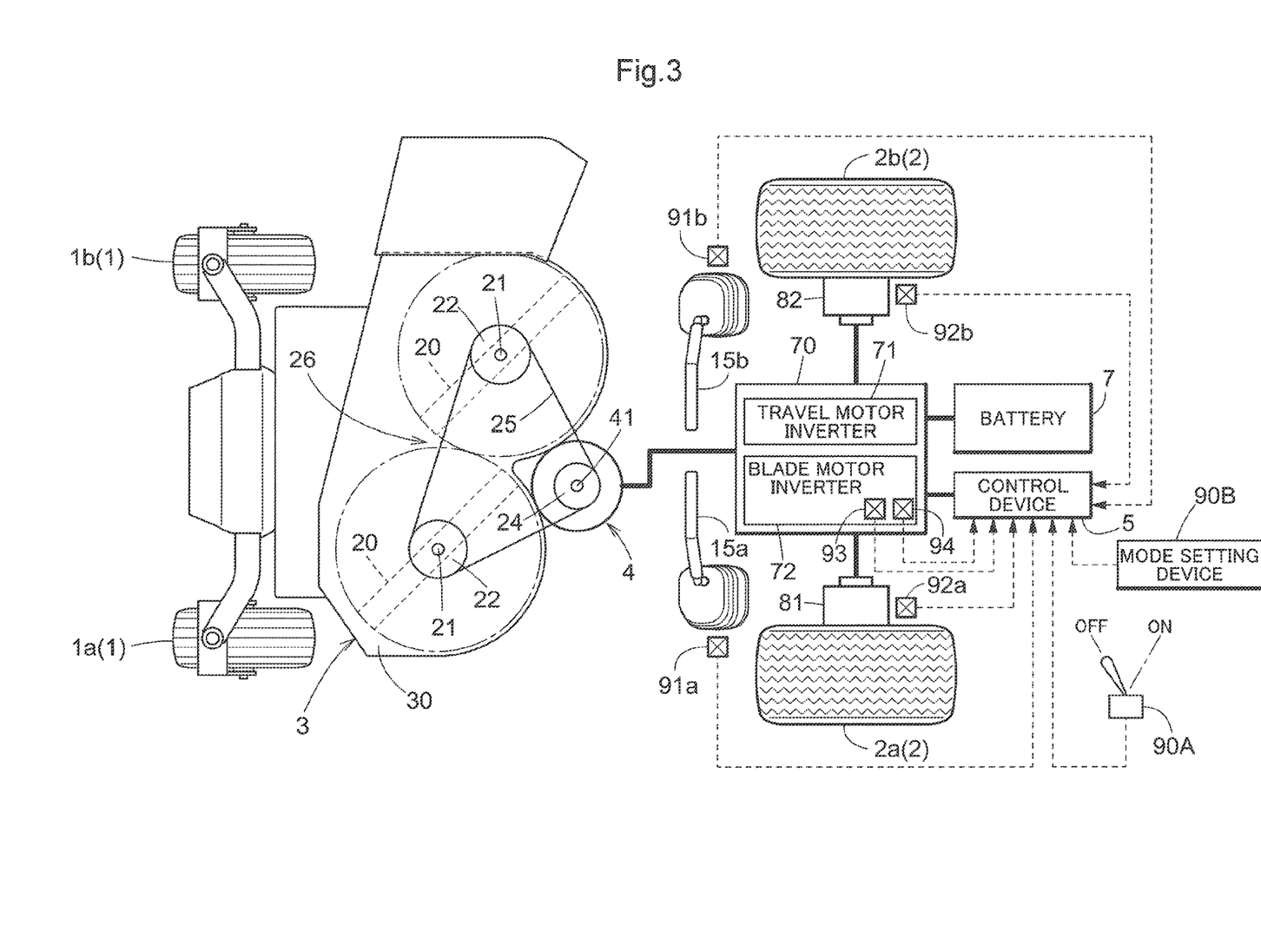
FIG. 3 is a schematic diagram showing the motive power system and the control system of the electric grass mower.
Figure 4:
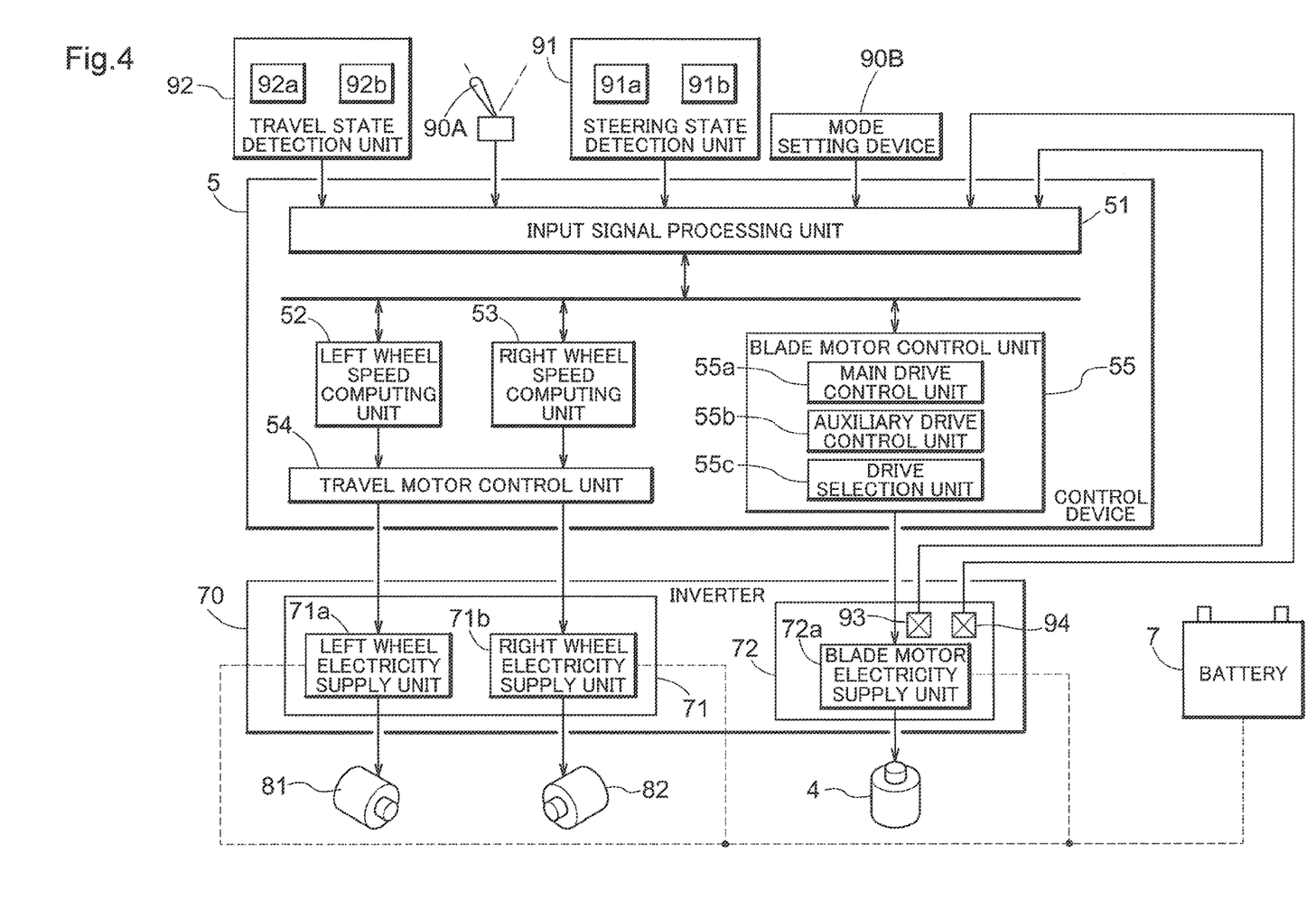
FIG. 4 is a functional block diagram of the control system.

FIG. 3 schematically shows the motive power system and the control system of the grass mower. FIG. 4 shows a control device 5 serving as a core element of the control system, an inverter 70, and various sensors.

Electric power is supplied from the inverter 70 to a left motor 81 and a right motor 82 that serve as travel motors for respectively rotating the left rear wheel 2a and the right rear wheel 2b, and the blade motor 4 configured to rotate the rotary blades 20. The inverter 70 includes a travel motor inverter 71 that supplies electric power to the left motor 81 and the right motor 82, and a blade motor inverter 72 that supplies electric power to the blade motor 4. The inverter 70 is driven based on control signals from the control device 5. The inverter 70 is connected to the battery 7 serving as an electric power source.

A mower operation tool 90A, a mode setting device 90B, a left steering angle detection sensor 91a, a right steering angle detection sensor 91b, a left motor rotation detection sensor 92a, a right motor rotation detection sensor 92b, a blade motor rotation detection sensor 93, and an electric current detection unit 94 are connected to the control device 5.

The mower operation tool 90A is a manual operation tool for selecting either of driving of the blade motor 4 and stopping driving of the blade motor 4. In this embodiment, the mower operation tool 90A is configured as a swing lever that is swung between a first position (ON) and a second position (OFF). When the mower operation tool 90A is swung to the first position, a driving instruction for instructing the control device 5 to drive the blade motor 4 is transmitted, and when the mower operation tool 90A is swung to the second position, a stopping instruction for instructing the control device 5 to stop driving the blade motor 4 is transmitted to the control device 5.

With this grass mower, at the start of mowing with use of the rotary blades 20, that is, at the start of rotation of the rotary blades 20, the rotary blades 20 are rotated backward for a short period of time (temporarily). When a plurality of modes (driving modes) that specify this short-period backward driving of the rotary blades 20 are prepared, the mode setting device 90B sets the driving mode to be carried out.

The left steering angle detection sensor 91a detects the swing angle of the left steering lever 15a. The right steering angle detection sensor 91b detects the swing angle of the right steering lever 15b. The left motor rotation detection sensor 92a detects the rotation rate of the left motor 81. The right motor rotation detection sensor 92b detects the rotation rate of the right motor 82. The blade motor rotation detection sensor 93 detects the rotation rate of the blade motor 4. The electric current detection unit 94 incorporated in the blade motor inverter 72 detects an electric current flowing in the blade motor 4.

As shown in FIG. 4, detection signals from a steering state detection unit 91 that includes the left steering angle detection sensor 91a and the right steering angle detection sensor 91b, and a travel state detection unit 92 that includes the left motor rotation detection sensor 92a and the right motor rotation detection sensor 92b are input to the control device 5. Furthermore, signals from the mower operation tool 90A and the mode setting device 90B are also input to the control device 5.

The control device 5 includes functional units such as an input signal processing unit 51, a left wheel speed computing unit 52, a right wheel speed computing unit 53, a travel motor control unit 54, and a blade motor control unit 55, and these functional units are constructed with hardware or software. The input signal processing unit 51 includes sensor information processing functions and operational input processing functions. The input signal processing unit 51 processes external signals from the steering state detection unit 91, the travel state detection unit 92, the mower operation tool 90A, the mode setting device 90B, and the like, and converts the signals into data that can be used by the control device 5.

The left wheel speed computing unit 52 determines the rotational speed (rotation rate) of the left rear wheel 2a, that is, the rotational speed (rotation rate) of the left motor 81, based on the operational information input by the left steering angle detection sensor 91a, which detects the operation amount of the left steering lever 15a operated by the driver. The right wheel speed computing unit 53 also determines the rotational speed (rotation rate) of the right rear wheel 2b, that is, the rotational speed (rotation rate) of the right motor 82, based on the operational information input by the right steering angle detection sensor 91b, which detects the operation amount of the right steering lever 15b operated by the driver.

The travel motor control unit 54 transmits, to the travel motor inverter 71, control signals configured to supply, to the left motor 81 and the right motor 82, electric power required to realize the rotational speed of the left motor 81 and the rotational speed of the right motor 82 that are determined by the left wheel speed computing unit 52 and the right wheel speed computing unit 53. The travel motor inverter 71 includes a left wheel electricity supply unit 71a and a right wheel electricity supply unit 71b. Since the rotational speeds of the left motor 81 and the right motor 82 are independently changed according to the amounts of electric power supplied by the left wheel electricity supply unit 71a and the right wheel electricity supply unit 71b, the rotational speeds of the left rear wheel 2a and the right rear wheel 2b can be varied, and the direction of the grass mower is changed according to this difference between the speeds of the left rear wheel and the right rear wheel.

The blade motor control unit 55 includes a main drive control unit 55a, an auxiliary drive control unit 55b, and a drive selection unit 55c. The main drive control unit 55a controls driving of the blade motor 4 such that the rotary blades 20 are rotated forward. The auxiliary drive control unit 55b controls driving of the blade motor 4 such that the rotary blades 20 are rotated backward. The drive selection unit 55c selectively operates the main drive control unit 55a and the auxiliary drive control unit 55b in accordance with a drive mode set by the mode setting device 90B. That is, when the mower operation tool 90A is set to the first position (ON), the blade motor control unit 55 drives the blade motor 4 by controlling a blade motor electricity supply unit 72a of the blade motor inverter 72 in accordance with a drive mode set by the mode setting device 90B. Note that, although the main drive control unit 55a, the auxiliary drive control unit 55b, and the drive selection unit 55c are shown as separate functional blocks in FIG. 4, this is for the purpose of facilitating comprehension of the functions thereof, and these units may be integrated as a drive control unit.

Next, examples of drive modes that can be set by the mode setting device 90B will be described. In all of the modes, the rotary blades 20 are rotated backward for a short period of time at the start of rotation of the rotary blades 20.

(1) First Mode

At the start of rotation of the rotary blades 20, the rotary blades 20 are first rotated backward for a predetermined period of time (short period), and then the rotary blades 20 are rotated forward to perform a mowing operation. That is, at the start of mowing with use of the rotary blades 20, the drive selection unit 55c first operates the auxiliary drive control unit 55b temporarily, and then operates the main drive control unit 55a instead of the auxiliary drive control unit 55b.

(2) Second Mode

At the start of rotation of the rotary blades 20, forward rotation and backward rotation of the rotary blades 20 are repeated a predetermined number of times for only a short period of time (each rotation is performed for a predetermined period of time), and the rotary blades 20 are finally rotated forward to perform a mowing operation. Here, the predetermined number of times is preferably one or more. That is, at the start of mowing with use of the rotary blades 20, the drive selection unit 55c repeats the operation of the main drive control unit 55a and the operation of the auxiliary drive control unit 55b alternately the predetermined number of times, and then operates the main drive control unit 55a. Although the first rotation may be forward rotation or backward rotation, it is preferable to start with backward rotation in consideration of clogging.

(3) Third Mode

In this third mode, the electric current detection unit 94 of the blade motor electricity supply unit 72a is used as a load detector for detecting an excessive load that occurs upon startup of the blade motor 4. A combination of the electric current detection unit 94 and the blade motor rotation detection sensor 93 may also be used as a load detector. The rotary blades 20 are rotated forward at the start of rotation of the rotary blades 20, and if the electric current detection unit 94 detects an excessive load at this time, the rotary blades 20 will be rotated backward for a predetermined period of time (short period), and then the rotary blades 20 will be rotated forward to perform a mowing operation. That is, the drive selection unit 55c operates the main drive control unit 55a at the start of mowing with use of the rotary blades 20, and if the load detector detects an excessive load at this time, the drive selection unit 55c will temporarily operate the auxiliary drive control unit 55b instead of the main drive control unit 55a, and then operate the main drive control unit 55a instead of the auxiliary drive control unit 55b. If an excessive load is not detected, the operation of the main drive control unit 55a will be continued as is, and the mowing operation will be performed.

The short-period (temporary) rotation of the blade motor 4 in the modes mentioned above can be specified by a predetermined period of time or a predetermined rotation angle. For example, when it is specified by a rotation angle, a suitable drive angle is several tens of degrees, and when it is specified by a period of time, a suitable drive period is in the scale of seconds. A configuration may also be employed in which these values can be adjusted depending on the conditions of the mowing operation.

Modes other than the above-mentioned three modes may also be set. If only a single mode is implemented, the mode setting device 90B need not be provided. Furthermore, a configuration may also be employed in which a mode in which a short-period backward rotation is not performed, that is, a mode in which the auxiliary drive control unit 55b is not operated, can be set, which is convenient for a mowing operation in which clogging due to cut grass does not occur.

Figure 5:
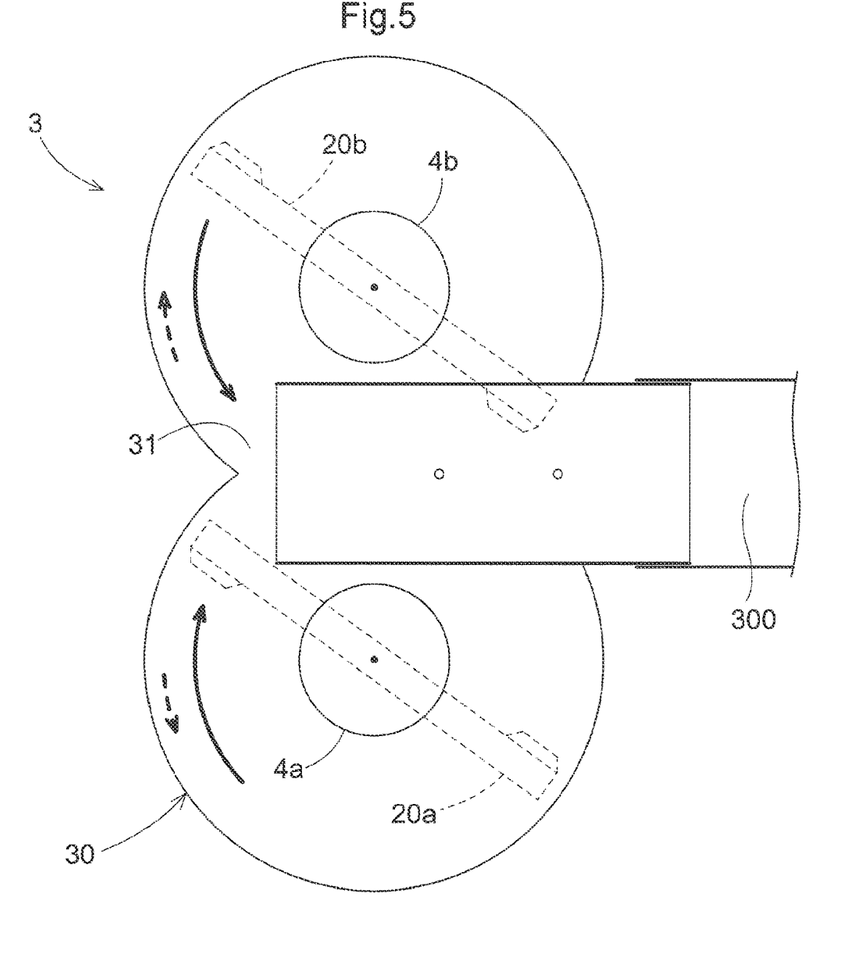
FIG. 5 is a plan view schematically showing a mower unit of the other embodiment.
Figure 6:
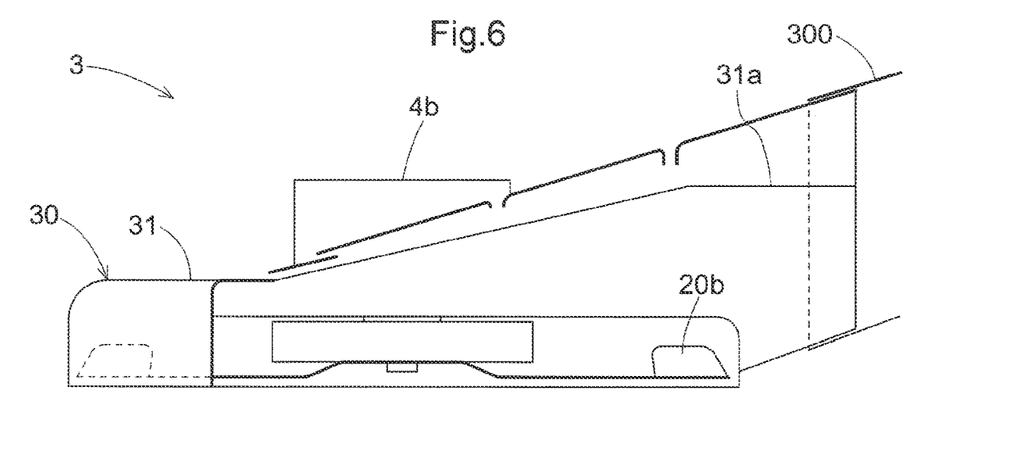
FIG. 6 is a side view schematically showing the mower unit of the other embodiment.

FIG. 5 schematically shows a plan view of a mower unit 3 of another embodiment, and FIG. 6 shows a lateral cross-sectional view thereof. A left rotary blade 20a and a right rotary blade 20b are arranged side by side in this mower unit 3. Moreover, the central portion of a top plate 31 of a mower deck 30 that houses the left rotary blade 20a and the right rotary blade 20b bulges upward, and the center of the rear portion of the mower deck 30 is open. Furthermore, a cut-grass discharge duct 300 is attached so as to cover the opening and a bulging portion 31a of the top plate 31 (see FIG. 6). The cut-grass discharge duct 300 extends rearward and is connected to a grass collection container (not shown).

In this mower unit 3, the left rotary blade 20a is rotated in the clockwise direction (direction indicated by the thick solid arrow in FIG. 5) and the right rotary blade 20b is rotated in the counterclockwise direction (direction indicated by the thick dotted arrow in FIG. 5) in a plan view in order to generate rearward transporting wind with which grass cut by the left rotary blade 20a and the right rotary blade 20b is fed to the cut-grass discharge duct 300. That is, the forward rotation of the left rotary blade 20a is the clockwise rotation, and the counterclockwise rotation is backward rotation. The forward rotation of the right rotary blade 20b is the counterclockwise rotation, and the clockwise rotation is backward rotation.

In this embodiment, a left blade motor 4a configured to rotate the left rotary blade 20a and a right blade motor 4b configured to rotate the right rotary blade 20b are separately provided on the top plate 31 of the mower deck 30 in order to rotate the left rotary blade 20a and the right rotary blade 20b in different rotational directions. It will be appreciated that a single blade motor 4 can also be used if the belt 25 of the belt transmission mechanism 26 is wound a different way.

Also, in this mower unit 3, as described in the foregoing embodiment, the blade motor control unit 55 can rotate the left rotary blade 20a and the right rotary blade 20b backward for a short period of time (temporarily) in accordance with a set drive mode at the start of rotation of the left rotary blade 20a and the right rotary blade 20b.

OTHER EMBODIMENTS (1) Although the embodiments described above include the two-blade-type mower unit 3 provided with the two rotary blades 20, the present invention can also be applied to a riding grass mower that includes a mower unit 3 provided with a single rotary blade 20 or a mower unit 3 provided with three or more rotary blades 20.

(2) Although the travel motor is used as the motive power source for the driving wheel unit 2 in the embodiments described above, the travel motor may be replaced with an internal combustion engine. Furthermore, the motive power source for the mower unit 3 may also be replaced with an internal combustion engine. In such a case, a continuously variable transmission device capable of being rotated forward and backward is provided between the internal combustion engine and the mower unit 3.

(3) Although the grass mower of the embodiments described above is a mid-mount grass mower in which the mower unit 3 is disposed between the front wheels and the rear wheels, a front-mower-type grass mower in which a mower unit 3 is disposed forward of the front wheels may also be employed.

(4) Although the grass mower of the embodiments described above is a so-called zero-turn type vehicle in which the left rear wheel 2a and the right rear wheel 2b of the driving wheel unit 2 can be independently driven, a grass mower in which a front wheel unit 1 serves as steering wheels and a left rear wheel 2a and a right rear wheel 2b are coupled with use of a differential mechanism may also be employed.

INDUSTRIAL APPLICABILITY

The present invention can be provided to various grass mowers such as riding grass mowers that include a mower unit provided with a rotary mowing blade that is rotated by motive power.

LIST OF REFERENCE NUMERALS

3: Mower unit
4: Blade motor
4a: Left blade motor
4b: Right blade motor
5: Control device
10: Travel chassis
11: Driver seat
20: Rotary blade
20a: Left rotary blade
20b: Right rotary blade
30: Mower deck
55: Blade motor control unit
55a: Main drive control unit
55b: Auxiliary drive control unit
55c: Drive selection unit
72: Blade motor inverter
72a: Blade motor electricity supply unit
90A: Mower operation tool
90B: Mode setting device
93: Blade motor rotation detection sensor
94: Electric current detection unit (Load detector)

What is claimed is:

1. A riding grass mower comprising:
a travel chassis;
a driver seat in the travel chassis;
a mower deck supported by the travel chassis;
a rotary blade in a grass-cutting space defined by a side wall and a top plate of the mower deck;
a blade motor configured to supply motive power to the rotary blade;
a blade motor control unit configured to control the blade motor;
a mower operation tool as a manual operation tool for selecting either of driving of the blade motor and stopping driving of the blade motor; and
a mode setting device configured to set a drive mode from a plurality of drive modes,
wherein in response to the mower operation tool being operated to ON and mowing being started with use of the rotary blade, the blade motor control unit temporarily rotates backward the blade motor in accordance with the drive mode set by the mode setting device, and then rotates forward the blade motor,
wherein the blade motor control unit comprises:
a main drive control unit configured to rotate the rotary blade forward;
an auxiliary drive control unit configured to rotate the rotary blade backward;
a drive selection unit configured to selectively operate the main drive control unit and the auxiliary drive control unit in accordance with the drive mode set by the mode setting device; and
a load detector configured to detect an excessive load that occurs upon start up of the blade motor,
wherein in a first mode as one of the drive modes, the drive selection unit operates the auxiliary drive control unit so as to rotate the blade motor backward for a predetermined period of time or by a predetermined rotation angle, at the start of the mowing, and then operates the main drive control unit instead of the auxiliary drive control unit,
wherein in a second mode as one of the drive modes, the drive selection unit repeats an operation of the main drive control unit and an operation of the auxiliary drive control unit alternately a predetermined number of times at the start of the mowing with use of the rotary blade, and then operates the main drive control unit, and
wherein in a third mode as one of the drive modes, the drive selection unit operates the main drive control unit at the start of the mowing with use of the rotary blade, and in response to the load detector detecting the excessive load at the start of the mowing, the drive selection unit operates the auxiliary drive control unit instead of the main drive control unit, and then operates the main drive control unit instead of the auxiliary drive control unit.

2. A riding grass mower comprising:
a travel chassis;
a driver seat in the travel chassis;
a mower deck supported by the travel chassis;
a rotary blade in a grass-cutting space defined by a side wall and a top plate of the mower deck;
a blade motor configured to supply motive power to the rotary blade;
a blade motor control unit configured to control the blade motor;
a mower operation tool as a manual operation tool for selecting either of driving of the blade motor and stopping driving of the blade motor; and
a mode setting device configured to set a drive mode from a plurality of drive modes,
wherein in response to the mower operation tool being operated to ON and mowing being started with use of the rotary blade, the blade motor control unit temporarily rotates backward the blade motor in accordance with the drive mode set by the mode setting device, and then rotates forward the blade motor,
wherein the blade motor control unit comprises:
a main drive control unit configured to rotate the rotary blade forward;
an auxiliary drive control unit configured to rotate the rotary blade backward; and
a drive selection unit configured to selectively operate the main drive control unit and the auxiliary drive control unit in accordance with the drive mode set by the mode setting device, wherein the drive modes include a mode in which the drive selection unit operates the auxiliary drive control unit at the start of the mowing with use of the rotary blade, and then operates the main drive control unit instead of the auxiliary drive control unit.

* * * * *